United States Patent
Tang

(10) Patent No.: US 12,256,396 B2
(45) Date of Patent: Mar. 18, 2025

(54) METHOD FOR INDICATING STOPPING OF TRANSMISSION, TERMINAL DEVICE, NETWORK DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 443 days.

(21) Appl. No.: 17/180,259

(22) Filed: Feb. 19, 2021

(65) Prior Publication Data
US 2021/0203556 A1    Jul. 1, 2021

Related U.S. Application Data

(63) Continuation of application No. PCT/CN2018/103486, filed on Aug. 31, 2018.

(51) Int. Cl.
*H04L 12/24* (2006.01)
*H04L 41/0893* (2022.01)
*H04W 72/04* (2023.01)
*H04W 72/23* (2023.01)

(52) U.S. Cl.
CPC .......... *H04W 72/23* (2023.01); *H04L 41/0893* (2013.01)

(58) Field of Classification Search
CPC ............................ H04L 41/0893; H04W 72/23

USPC ........................................................ 370/254
See application file for complete search history.

(56) References Cited

U.S. PATENT DOCUMENTS

| | | | | |
|---|---|---|---|---|
| 11,632,753 | B2* | 4/2023 | Mu | H04W 4/70 |
| | | | | 370/329 |
| 2015/0257070 | A1* | 9/2015 | Zhao | H04W 36/22 |
| | | | | 370/331 |
| 2016/0056933 | A1* | 2/2016 | Aiba | H04W 72/20 |
| | | | | 370/329 |
| 2018/0042030 | A1 | 2/2018 | Xu et al. | |
| 2019/0306801 | A1* | 10/2019 | Zhou | H04W 52/04 |
| 2019/0349146 | A1 | 11/2019 | Wu et al. | |

(Continued)

FOREIGN PATENT DOCUMENTS

| | | |
|---|---|---|
| CN | 101873670 A | 10/2010 |
| CN | 102170624 A | 8/2011 |
| CN | 102421148 A | 4/2012 |

(Continued)

OTHER PUBLICATIONS

3GPP R1-1717502; Prague, CZ, Oct. 9-13, 2017.*

(Continued)

*Primary Examiner* — Faisal Choudhury
(74) *Attorney, Agent, or Firm* — PERKINS COIE LLP

(57) ABSTRACT

A method for indicating the stopping of a transmission, a terminal device and a network device are provided. The method includes: a terminal device acquires configuration information of a transmission stopping indication, and the terminal device receives transmission stopping indication information based on the configuration information. The transmission stopping indication information is used for indicating to the terminal device to stop a data transmission.

17 Claims, 2 Drawing Sheets

A terminal device acquires configuration information of a transmission stopping indication — S201

The terminal device receives transmission stopping indication information based on the configuration information — S202

(56) References Cited

U.S. PATENT DOCUMENTS

2020/0092039 A1* 3/2020 Wang ............... H04L 1/0036
2021/0235503 A1* 7/2021 Irukulapati ............... H04L 1/08

FOREIGN PATENT DOCUMENTS

| CN | 107432041 A | 12/2017 |
| CN | 107896389 A | 4/2018 |
| CN | 108024310 A | 5/2018 |
| CN | 108029157 A | 5/2018 |
| CN | 108347321 A | 7/2018 |
| EP | 3547766 A1 | 10/2019 |
| EP | 3547780 A1 | 10/2019 |
| EP | 3720217 A1 | 10/2020 |
| KR | 20180026322 A | 3/2018 |
| WO | 2018022697 A1 | 2/2018 |
| WO | 2018059511 A1 | 4/2018 |
| WO | WO-2019158039 A1 * | 8/2019 |

OTHER PUBLICATIONS

U.S. Appl. No. 62/669,722, filed May 10, 2018.*
First Office Action of the European application No. 18931979.1, issued on Mar. 4, 2022. 6 pages.
Notice of Acceptance of the Australian application No. 2018438369, issued on Mar. 3, 2022. 3 pages.
Notice of Reasons for Refusal of the Japanese application No. 2021-510166, issued on Mar. 25, 2022. 8 pages with English Translation.
Decision to Grant Patent Right for Chinese Application No. 202110532801.2 issued Oct. 28, 2022. 6 pages with English translation.
International Search Report dated May 30, 2019 cited in PCT/CN2018/103486.
Examination Report for Indian Application No. 202127007605 issued Jan. 18, 2022. 7 pages with English translation.
Examination Report No. 1 for Australian Application No. 2018438369 issued Oct. 28, 2021. 4 pages.
EPO, Extended European Search Report for European Application No. 18931979.1. Mail Date: Jun. 30, 2021. 11 pages.
Fujitsu "On UL multiplexing of transmissions with different reliability requirements" R1-1803944; 3GPP TSF RAN WG1 Meeting #92bis; Sanya, China Apr. 16-20, 2018. 5 pages.
Intel Corporation "Multiplexing of UL transmissions with different data durations and latency requirements" R1-1712601; 3GPP TSF RAN WG1 Meeting #90; Prague, Czech Republic, Aug. 21-25, 2017. 5 pages.
InterDigital Inc. "On dynamic resource sharing between eMBB and URLLC in UL" R1-1804854; 3GPP TSG RAN WG1 Meeting #92bis; Sanya, China; Apr. 16-20, 2018. 5 pages.
Samsung "Multiplexing of UL Transmissions with Different Reliability Requirements" R1-1802002; 3GPP TSF RAN WG1 Meeting #92; Athens, Greece; Feb. 26-Mar. 2, 2018. 7 pages.
TCL Communication "Multiplexing of UL Transmissions with Different Reliabilities" R1-1807406; 3GPP TSF RAN WG1 Meeting 93; Busan, South Korea, May 21-25, 2018. 5 pages.
ZTE et al. "UL multiplexing of transmissions with different reliability requirements" R1-1803803; 3GPP TSG RAN WG1 Meeting #92bis; Sanya, China, Apr. 16-20, 2018. 6 pages.
Decision of Refusal for Japanese Application No. 2021-510166 issued Jul. 22, 2022. 5 pages with English translation.
Examination Report for European Application No. 18931979.1 issued Aug. 18, 2022. 6 pages.
First Office Action for Chinese Application No. 202110532801.2 issued Aug. 22, 2022. 21 pages with English translation.

* cited by examiner

METHOD FOR INDICATING STOPPING OF TRANSMISSION, TERMINAL DEVICE, NETWORK DEVICE AND STORAGE MEDIUM

CROSS-REFERENCE TO RELATED APPLICATION

The present application is a continuation application of International PCT Application No. PCT/CN2018/103486 filed on Aug. 31, 2018, the entire content of which is hereby incorporated by reference.

TECHNICAL FIELD

The present disclosure relates to the technical field of wireless communication, in particular to a method for indicating stopping of a transmission, a terminal device, a network device and a storage medium.

BACKGROUND

A 5$^{th}$ Generation (5G) New Radio (NR) system supports both Enhance Mobile Broadband (eMBB) services and Ultra Reliable & Low Latency Communication (URLLC) services. A feature of the URLLC services is to achieve an ultra-high reliability (e.g. 99.999%) transmission within an extreme time delay (e.g. 1 ms). In order to reflect the feature of the URLLC services, a Preemption mechanism is introduced.

As shown in FIG. 1, the Preemption mechanism refers to inserting a URLLC service in a transmission process of an eMBB service. In this process, as the insertion of the URLLC service is not known, a terminal device corresponding to the eMBB service demodulates data of the URLLC service as data of the eMBB service, which severely affects the demodulation performance for the data of the eMBB service. In order to reduce influence of the URLLC service on the eMBB service, a network device sends a Preemption Indicator to the terminal device, wherein the Preemption Indicator is used for the terminal device to determine which time domain resources are occupied by the URLLC service. However, sending time of the Preemption Indicator lags behind time of the Preemption, thus in-time stopping of an uplink transmission cannot be realized.

In related technologies, there is yet no effective solution at present about how to stop an uplink transmission in time.

SUMMARY

In order to solve the above technical problem, embodiments of the present disclosure provide a method for indicating stopping of a transmission, a terminal device, a network device and a storage medium.

In a first aspect, an embodiment of the present disclosure provides a method for indicating stopping of a transmission, including: acquiring, by a terminal device, configuration information of a transmission stopping indication; and receiving, by the terminal device, transmission stopping indication information based on the configuration information, wherein the transmission stopping indication information is used for indicating to the terminal device to stop a data transmission.

In a second aspect, an embodiment of the present disclosure provides a method for indicating stopping of a transmission, including: sending, by a network device, configuration information of a transmission stopping indication; the configuration information is used for a terminal device to receive transmission stopping indication information, and the transmission stopping indication information is used for indicating to the terminal device to stop a data transmission.

In a third aspect, an embodiment of the present disclosure provides a terminal device, including: a processing unit, configured to acquire configuration information of a transmission stopping indication; and a receiving unit, configured to receive transmission stopping indication information based on the configuration information, wherein the transmission stopping indication information is used for indicating to the terminal device to stop a data transmission.

In a fourth aspect, an embodiment of the present disclosure provides a network device, including: a sending unit, configured to send configuration information of a transmission stopping indication; the configuration information is used for a terminal device to receive transmission stopping indication information, and the transmission stopping indication information is used for indicating to the terminal device to stop a data transmission.

In a fifth aspect, an embodiment of the present disclosure provides a terminal device, including: a processor and a memory configured to store a computer program which is able to be run on the processor, wherein the processor is configured to execute, when running the computer program, acts of the above method for indicating stopping of a transmission performed by a terminal device.

In a sixth aspect, an embodiment of the present disclosure provides a network device, including: a processor and a memory configured to store a computer program which is able to be run on the processor, wherein the processor is configured to execute, when running the computer program, acts of the above method for indicating stopping of a transmission performed by a network device.

In a seventh aspect, an embodiment of the present disclosure provides a storage medium, storing an executable program, wherein when the executable program is executed by a processor, the above method for indicating stopping of a transmission performed by a terminal device is implemented.

In an eighth aspect, an embodiment of the present disclosure provides a storage medium, storing an executable program, wherein when the executable program is executed by a processor, the above method for indicating stopping of a transmission performed by a network device is implemented.

DETAILED DESCRIPTION

For more detailed understanding of features and technical contents of embodiments of the present disclosure, implementations of the embodiments of the present disclosure will be described in detail below with reference to accompanying drawings, and the accompanying drawings are used for reference only and are not intended to limit the embodiments of the present disclosure.

In order to solve a problem that an uplink transmission cannot be stopped in time in related technologies, in an embodiment of the present disclosure, a terminal device frequently detects a transmission stopping signal so as to stop a data transmission in time. However, the frequent detection of the transmission stopping signal will inevitably increase power consumption and complexity of the detection. Particularly, when the transmission stopping signal is borne in downlink control signaling, blind detection is required to be performed, which further increases the complexity of the detection and increases signaling overhead.

For this reason, the present disclosure provides a method for indicating stopping of a transmission, for a terminal device to stop a data transmission in time, so as to improve data demodulation performance for an eMBB service, and reduce influence of a URLLC service on the eMBB service. The method for indicating stopping of a transmission of the embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system, or the like.

Figure 1:
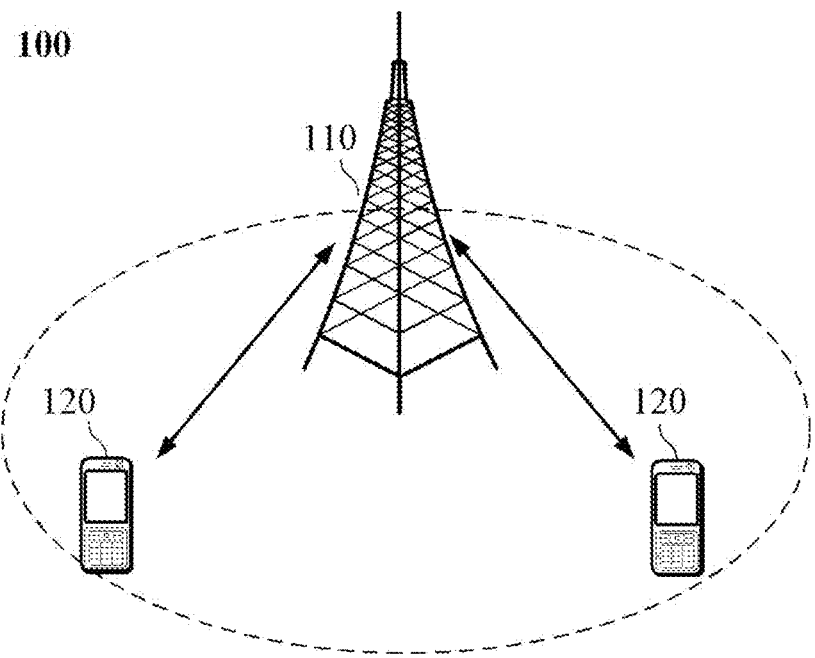
FIG. 1 is a schematic diagram of constituent structure of a communication system according to an embodiment of the present disclosure.

Illustratively, a communication system 100 applied in an embodiment of the present application is as shown in FIG. 1. The communication system 100 may include a network device 110, wherein the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within a coverage range of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal which may combine with a cellular radio telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, the 5G system or 5G network may also be referred to as a New Radio (NR) system or an NR network.

FIG. 1 shows one network device and two terminal devices as an example. Optionally, the communication system 100 may include multiple network devices, and other quantity of terminal devices may be included within a coverage area of each network device, which is not limited in embodiments of the present application.

Optionally, the communication system 100 may further include another network entity such as a network controller, a mobile management entity, or the like, which is not limited in embodiments of the present application.

It should be understood that, a device with a communication function in a network/system in embodiments of the present application may be referred to as a communication device. Taking the communication system 100 shown in FIG. 1 as an example, communication devices may include a network device 110 and a terminal device 120 which have communication functions, and the network device 110 and the terminal device 120 may be the specific devices described above, which is not repeated here again; and communication devices may also include another device in the communication system 100, such as a network controller, a mobile management entity, or another network entity, which is limited in embodiments of the present application.

Figure 2:
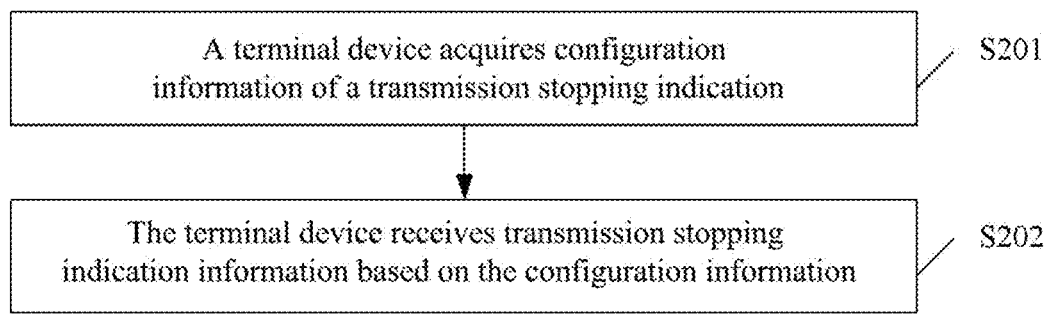
FIG. 2 is a schematic diagram of an optional processing flow of a method for indicating stopping of a transmission applied to a terminal device according to an embodiment of the present disclosure.

As shown in FIG. 2, an optional processing flow of a method for indicating stopping of a transmission applied to a terminal device provided by an embodiment of the present disclosure includes following acts.

In act S201, a terminal device acquires configuration information of a transmission stopping indication.

In some embodiments, the terminal device receives the configuration information of the transmission stopping indication sent by a network device.

Herein, the configuration information is used for indicating to the terminal device to receive related information of transmission stopping indication information, such as time when receiving of data is stopped, a frequency domain position where the receiving of the data is stopped, or the like. Accordingly, the configuration information at least includes a first data processing mode and a second data processing mode. The first data processing mode is used for indicating to the terminal device to stop a data transmission, and the second data processing mode is used for indicating to the terminal device to retransmit the data, that is, to reschedule the data.

The configuration information at least further includes a configuration mode, wherein the configuration mode refers to an object to which the configuration information applies. For example, the configuration mode at least includes a subscriber-specific configuration mode, a subscriber group-specific configuration mode, or a combination of the subscriber-specific configuration mode and the subscriber group-specific configuration mode. Then, when the configuration mode includes the subscriber-specific configuration mode, the configuration information is applicable to one subscriber; when the configuration mode includes the subscriber group-specific configuration mode, the configuration information is applicable to a subscriber group including multiple subscribers; and when the configuration mode includes the combination of the subscriber-specific configuration mode and the subscriber group-specific configuration mode, the configuration information is applicable to one subscriber as well as a subscriber group.

In some embodiments, the first data processing mode uses the subscriber group-specific configuration mode, and the second data processing mode uses the subscriber-specific configuration mode.

In some other embodiments, the first data processing mode uses the subscriber group-specific configuration mode, the subscriber-specific configuration mode, or the combination of the subscriber group-specific configuration mode and the subscriber-specific configuration mode.

In act S202, the terminal device receives transmission stopping indication information based on the configuration information.

Herein, the transmission stopping indication information is used for indicating to the terminal device to stop the data transmission.

In some embodiments, when the configuration mode in the configuration information is the subscriber-specific configuration mode, the terminal device receives the transmission stopping indication information based on subscriber-specific downlink control information. Herein, part of bit information in the downlink control information is used for indicating to the terminal device to stop the data transmission, or part of the bit information in the downlink control information is used for indicating to the terminal device to stop the data transmission according to a first policy.

In some other embodiments, when the configuration mode in the configuration information is the subscriber group-specific configuration mode, the terminal device receives the transmission stopping indication information based on group-common downlink control information. Herein, part of bit information in the group-common downlink control information is used for indicating to the terminal device to stop the data transmission, or part of the bit information in the group-common downlink control information is used for indicating to the terminal device to stop the data transmission according to the first policy. Moreover, the configuration information is also used for indicating a position of a subscriber who stops the data transmission in the subscriber group.

In an embodiment of the present disclosure, the first policy is pre-agreed by the terminal device and the network device, wherein the first policy at least includes stopping the data transmission when a scrambling code used for scrambling the data is a first scrambling code. In a specific implementation, when the terminal device determines that the configuration information indicates to the terminal device to stop the data transmission according to the first policy, the terminal device judges whether the scrambling code for scrambling the data is the first scrambling code, and if it is the first scrambling code, the terminal device stops the data transmission. Here, the first scrambling code is a Cell Radio Network Temporary Identifier (C-RNTI).

According to the method for indicating stopping of a transmission provided by the embodiment of the present disclosure, a terminal device acquires configuration information of a transmission stopping indication. In this way, when a URLLC service is inserted in a transmission process of an eMBB service, the terminal device corresponding to the eMBB service can receive transmission stopping indication information in time based on the configuration information, which not only improves data demodulation performance for the eMBB service, but also reduces influence of the URLLC service on the eMBB service and improves data processing efficiency.

Figure 3:
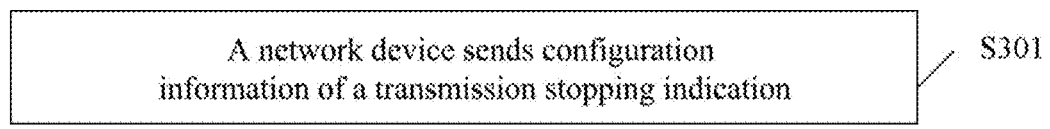
FIG. 3 is a schematic diagram of an optional processing flow of a method for indicating stopping of a transmission applied to a network device according to an embodiment of the present disclosure.

As shown in FIG. 3, an optional processing flow of a method for indicating stopping of a transmission applied to a network device provided by an embodiment of the present disclosure includes a following act.

In act S301, a network device sends configuration information of a transmission stopping indication.

In an embodiment of the present disclosure, the configuration information is used for a terminal device to receive transmission stopping indication information, wherein the transmission stopping indication information is used for indicating to the terminal device to stop a data transmission.

It should be noted that the configuration information of the transmission stopping indication and the transmission stopping indication information described in the embodiment of the present disclosure are the same as the configuration information of the transmission stopping indication and the transmission stopping indication information in act S201 and act S202, which is not repeated here again.

An embodiment of the present disclosure further provides a method for indicating stopping of a transmission applied to a communication system including a network device and a terminal device, including: act S401, the network device sends configuration information of a transmission stopping indication to the terminal device; act S402, the terminal device receives the configuration information of the transmission stopping indication; and act S403: the terminal device receives transmission stopping indication information based on the configuration information.

It should be noted that the configuration information of the transmission stopping indication and the transmission stopping indication information described in the embodiment of the present disclosure are the same as the configuration information of the transmission stopping indication and the transmission stopping indication information in act S201 and act S202, which is not repeated here again.

According to the method for indicating stopping of a transmission provided by the embodiment of the present disclosure, a network device sends configuration information of a transmission stopping indication so as to enable a terminal device to stop a data transmission according to the configuration information. For a subscriber-specific configuration mode, the terminal device only needs to detect subscriber-specific used downlink control information in order that transmission stopping indication information may be acquired. For a subscriber group-specific configuration mode, the terminal device only needs to detect group-common downlink control information in order that the transmission stopping indication information may be acquired. In this way, signaling overhead caused by sending indication information for scheduling data retransmission to the terminal device when the terminal device stops the data transmission and the network device cannot receive feedback information is avoided; moreover, signaling overhead caused by the terminal blind detecting transmitting stopping signals is avoided.

Figure 4:
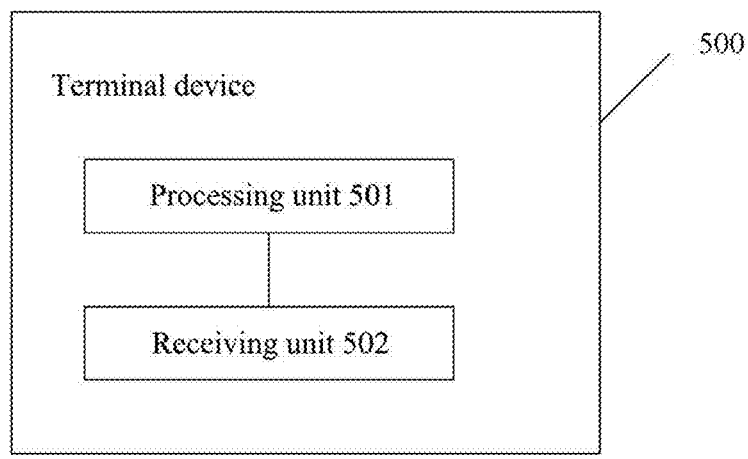
FIG. 4 is a schematic diagram of constituent structure of a terminal device according to an embodiment of the present disclosure.

An embodiment of the present disclosure further provides a terminal device, whose constituent structure is as shown in FIG. 4, and a terminal device 500 includes: a processing unit 501, configured to acquire configuration information of a transmission stopping indication; and a receiving unit 502, configured to receive transmission stopping indication information based on the configuration information, wherein the transmission stopping indication information is used for indicating to the terminal device to stop a data transmission.

In an embodiment of the present disclosure, the configuration information at least includes a first data processing mode or a second data processing mode. The first data processing mode is used for indicating to stop the data transmission, and the second data processing mode is used for indicating a data retransmission.

When the configuration information includes the first data processing mode, the configuration information at least further includes a configuration mode. The configuration mode at least includes a subscriber-specific configuration mode, a subscriber group-specific configuration mode, or a combination of the subscriber-specific configuration mode and the sub scriber group-specific configuration mode.

In an embodiment of the present disclosure, the receiving unit 502 is configured to receive the transmission stopping indication information based on subscriber-specific downlink control information when the configuration mode in the configuration information is the sub scriber-specific configuration mode.

In an embodiment of the present disclosure, the receiving unit is configured to receive the transmission stopping indication information based on group-common downlink control information when the configuration mode in the configuration information is the subscriber group-specific configuration mode.

In an embodiment of the present disclosure, part of bit information in the downlink control information is used for indicating to the terminal device to stop the data transmission.

In an embodiment of the present disclosure, part of the bit information in the downlink control information is used for indicating to the terminal device to stop the data transmission according to a first policy.

In an embodiment of the present disclosure, part of bit information in the group-common downlink control information is used for indicating to the terminal device to stop the data transmission.

In an embodiment of the present disclosure, part of the bit information in the group-common downlink control information is used for indicating to the terminal device to stop the data transmission according to the first policy.

In an embodiment of the present disclosure, the first policy includes stopping the data transmission when a scrambling code used for scrambling the data is a first scrambling code.

In an embodiment of the present disclosure, the configuration information of the transmission stopping indication at least includes one of following: time when the data transmission is stopped; a frequency domain position where the data transmission is stopped; and a correspondence between bits in the configuration information of the transmission stopping indication and subscribers within the subscriber group when the configuration mode includes the subscriber group-specific configuration mode.

Figure 5:
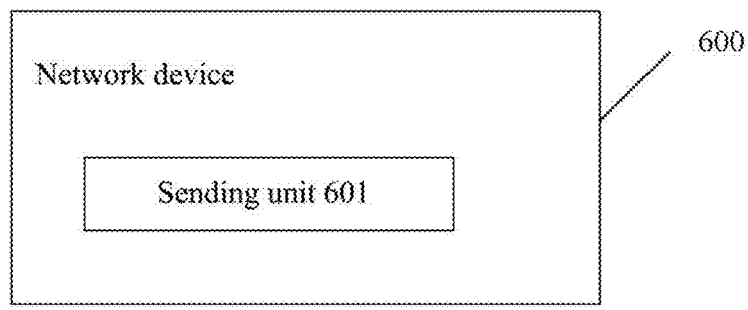
FIG. 5 is a schematic diagram of constituent structure of a network device according to an embodiment of the present disclosure.

An embodiment of the present disclosure further provides a network device, whose constituent structure is as shown in FIG. 5, and a network device 600 includes: a sending unit 601, configured to send configuration information of a transmission stopping indication; the configuration information is used for a terminal device to receive transmission stopping indication information, and the transmission stopping indication information is used for indicating to the terminal device to stop a data transmission.

In an embodiment of the present disclosure, the configuration information at least includes a first data processing mode or a second data processing mode. The first data processing mode is used for indicating to stop the data transmission, and the second data processing mode is used for indicating a data retransmission.

When the configuration information includes a first data processing mode, the configuration information at least further includes a configuration mode. The configuration mode at least includes a subscriber-specific configuration mode, a subscriber group-specific configuration mode, or a combination of the subscriber-specific configuration mode and the subscriber group-specific configuration mode.

In an embodiment of the present disclosure, when the configuration mode in the configuration information is the subscriber-specific configuration mode, the configuration information indicates to the terminal device to receive the transmission stopping indication information based on sub scriber-specific downlink control information.

In an embodiment of the present disclosure, when the configuration mode in the configuration information is the subscriber group specific-configuration mode, the configuration information indicates to the terminal device to receive the transmission stopping indication information based on group-common downlink control information.

In an embodiment of the present disclosure, part of bit information in the downlink control information is used for indicating to the terminal device to stop the data transmission.

In an embodiment of the present disclosure, part of the bit information in the downlink control information is used for indicating to the terminal device to stop the data transmission according to a first policy.

In an embodiment of the present disclosure, part of bit information in the group-common downlink control information is used for indicating to the terminal device to stop the data transmission.

In an embodiment of the present disclosure, part of the bit information in the group-common downlink control information is used for indicating to the terminal device to stop the data transmission according to the first policy.

In an embodiment of the present disclosure, the first policy includes stopping the data transmission when a scrambling code for scrambling the data is a first scrambling code.

In an embodiment of the present disclosure, the configuration information of the transmission stopping indication at least includes one of following: time when the data transmission is stopped; a frequency domain position where the data transmission is stopped; and a correspondence between bits in the configuration information of the transmission stopping indication and subscribers within the subscriber group when the configuration mode includes the subscriber group-specific configuration mode.

An embodiment of the present disclosure further provides a terminal device, including: a processor and a memory configured to store a computer program which is able to be run on the processor, wherein the processor is configured to execute, when running the computer program, acts of the above method for indicating stopping of a transmission performed by a terminal device.

An embodiment of the present disclosure further provides a network device, including: a processor and a memory configured to store a computer program which is able to be run on the processor, wherein the processor is configured to execute, when running the computer program, acts of the above method for indicating stopping of a transmission performed by a network device.

Figure 6:
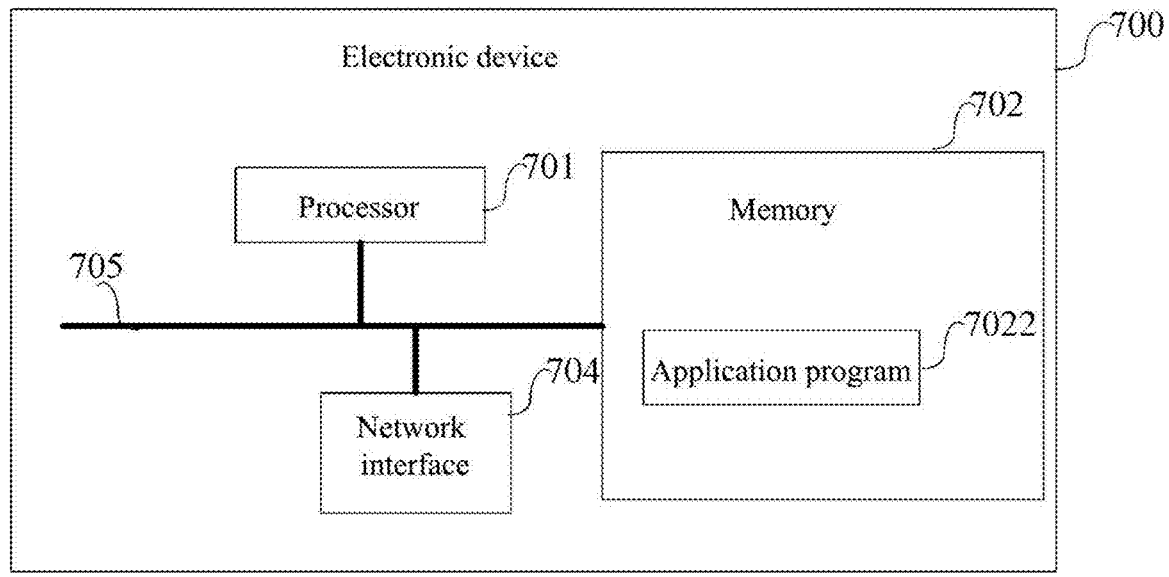
FIG. 6 is a schematic diagram of constituent structure of hardware of an electronic device according to an embodiment of the present disclosure.

FIG. 6 is a schematic diagram of constituent structure of hardware of an electronic device (network device or terminal device) of an embodiment of the present disclosure, and an electronic device 700 includes at least one processor 701, a memory 702 and at least one network interface 704. Various components in the electronic device 700 are coupled together by a bus system 705. It can be understood that the bus system 705 is used for implementing connection and communication between these components. In addition to a data bus, the bus system 705 further includes a power bus, a control bus, and a status signal bus. However, for clarity of description, all kinds of buses are labeled as a bus system 705 in the FIG. 6.

It can be understood that the memory 702 may be a volatile memory or a non-volatile memory, or may include both the volatile memory and the non-volatile memory. Herein, the non-volatile memory may be a ROM, a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM); the magnetic surface memory may be a magnetic disk memory or a magnetic tape memory. The volatile memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRS-DRAM), an Enhanced Synchronous Dynamic Random Access Memory (ESDRAM), a SyncLink Dynamic Random Access Memory (SLDRAM), a Direct Rambus Random Access Memory (DRRAIVI). The memory 702 described in the embodiment of the present disclosure is intended to include, but not limited to, these and any other suitable types of memories.

The memory 702 in the embodiment of the present disclosure is used for storing various types of data to support an operation of the electronic device 700. Examples of these data include any computer program for operating on the electronic device 700, such as an application program 7022. A program for implementing the method of the embodiment of the present disclosure may be contained in the application program 7022.

The methods disclosed in above embodiments of the present disclosure may be applied in the processor 701 or implemented by the processor 701. The processor 701 may be an integrated circuit chip with a signal processing capability. In an implementation process, the acts of the above methods may be accomplished by an integrated logic circuit of hardware in the processor 701 or instructions in a form of software. The above processor 701 may be a general-purpose processor, a Digital Signal Processor (DSP), or another programmable logic device, a discrete gate or transistor logic device, a discrete hardware component, etc. The processor 701 may implement or execute the various methods, acts and logical block diagrams disclosed in the embodiments of the present disclosure. The general purpose processor may be a microprocessor or any conventional processor, or the like. Acts in combination with the methods disclosed in the embodiments of the present disclosure may be directly embodied as being executed and accomplished by a hardware decoding processor or by a combination of hardware and software modules in a decoding processor. The software module may be located in a storage medium, and the storage medium is located in the memory 702. The processor 701 reads information in the memory 702 and accomplishes the acts of the aforementioned methods in combination with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or another electronic component, for executing the aforementioned methods.

An embodiment of the present application further provides a computer readable storage medium, configured to store a computer program.

Optionally, the computer readable storage medium may be applied in a network device of an embodiment of the present application, and the computer program enables a computer to perform the corresponding processes implemented by the network device in various methods of the embodiments of the present application, which is not repeated here again for sake of brevity.

Optionally, the computer readable storage medium may be applied in a terminal device of an embodiment of the present application, and the computer program enables a computer to perform the corresponding processes implemented by the terminal device in various methods of the embodiments of the present application, which is not repeated here again for sake of brevity.

The present disclosure is described with reference to flowcharts and/or block diagrams of methods, devices (systems), and computer program products according to embodiments of the present disclosure. It should be understood that each flow and/or block in the flowcharts and/or the block diagrams, and combinations of flows and/or blocks in the flowcharts and/or the block diagrams can be implemented by computer program instructions. These computer program instructions may be provided to a processor of a general purpose computer, a special purpose computer, an embedded processor or another programmable data processing device to produce a machine, such that the instructions which are executed by the processor of the computer or another programmable data processing device produce an apparatus for implementing functions specified in one or more flows in a flow chart and/or one or more blocks in a block diagram.

These computer program instructions may also be stored in a computer-readable memory that can direct a computer or another programmable data processing device to operate in a specific mode, such that instructions stored in the computer-readable memory produce an article of manufacture including an instruction apparatus that implements the functions specified in one or more flows in a flow chart and/or one or more blocks in a block diagram.

These computer program instructions may also be loaded onto a computer or another programmable data processing device, such that a series of operational acts are performed on the computer or another programmable device to produce processing implemented by the computer, such that the instructions which are performed on the computer or another programmable device provide acts for implementing the functions specified in one or more flows in a flow chart and/or one or more blocks in a block diagram.

The above descriptions are only preferred embodiments of the present disclosure and are not intended to limit the scope of protection of the present disclosure. Any modification, equivalent substitution, improvement, etc. made within the spirit and principles of the present disclosure shall be covered by the scope of protection of the present disclosure.

What is claimed is:

1. A method for indicating stopping of a transmission, comprising:
    acquiring, by a terminal device, configuration information of a transmission stopping indication; and
    receiving, by the terminal device, transmission stopping indication information based on the configuration information, wherein the transmission stopping indication information is used for indicating to the terminal device to stop a data transmission; wherein the transmission stopping indication information and the configuration information are located in two pieces of information respectively;
    wherein the configuration information at least further comprises a configuration mode;
    wherein the configuration mode at least comprises a subscriber-specific configuration mode, a subscriber group-specific configuration mode, or a combination of the subscriber-specific configuration mode and the subscriber group-specific configuration mode;
    wherein receiving, by the terminal device, the transmission stopping indication information based on the configuration information comprises:
    receiving, by the terminal device, the transmission stopping indication information based on group-common downlink control information when the configuration mode in the configuration information is the subscriber group-specific configuration mode.

2. The method of claim 1, wherein the configuration information at least comprises a first data processing mode or a second data processing mode;
    the first data processing mode is used for indicating stopping of the data transmission; and
    the second data processing mode is used for indicating a data retransmission.

3. The method of claim 2, wherein the first data processing mode uses the subscriber group-specific configuration mode, and the second data processing mode uses the subscriber-specific configuration mode.

4. The method of claim 1, wherein the configuration information of the transmission stopping indication comprises at least one of following:
    time when the data transmission is stopped;
    a frequency domain position where the data transmission is stopped; and
    a correspondence between bits in the configuration information of the transmission stopping indication and subscribers within the subscriber group when the configuration mode comprises a subscriber group-specific configuration mode.

5. The method of claim 1, wherein part of bit information in the group-common downlink control information is used for indicating to the terminal device to stop the data transmission according to a first policy;
    the first policy comprises: stopping the data transmission when a scrambling code used for scrambling the data is a first scrambling code; wherein the first scrambling code is a Cell Radio Network Temporary Identifier (C-RNTI).

6. A method for indicating stopping of a transmission, comprising:
    sending, by a network device, configuration information of a transmission stopping indication, wherein the configuration information is used for a terminal device to receive transmission stopping indication information, and the transmission stopping indication information is used for indicating to the terminal device to stop a data transmission; wherein the transmission stopping indication information and the configuration information are located in two pieces of information respectively;
    wherein the configuration information at least further comprises a configuration mode;
    wherein the configuration mode at least comprises a subscriber-specific configuration mode, a subscriber group-specific configuration mode, or a combination of the subscriber-specific configuration mode and the subscriber group-specific configuration mode;
    wherein when the configuration mode in the configuration information is the subscriber group-specific configuration mode, the configuration information indicates to the terminal device to receive the transmission stopping indication information based on group-common downlink control information.

7. The method of claim 6, wherein the configuration information at least comprises a first data processing mode or a second data processing mode;
    the first data processing mode is used for indicating stopping of the data transmission; and
    the second data processing mode is used for indicating a data retransmission.

8. The method of claim 7, wherein the first data processing mode uses the subscriber group-specific configuration mode, and the second data processing mode uses the subscriber-specific configuration mode.

9. The method of claim 6, wherein part of bit information in the group-common downlink control information is used for indicating to the terminal device to stop the data transmission according to a first policy;
    the first policy comprises: stopping the data transmission when a scrambling code used for scrambling the data is a first scrambling code; wherein the first scrambling code is a Cell Radio Network Temporary Identifier (C-RNTI).

10. A terminal device, comprising: a processor and a network interface, wherein
the processor is configured to acquire configuration information of a transmission stopping indication; and
configured to receive, via the network interface, transmission stopping indication information based on the configuration information, wherein the transmission stopping indication information is used for indicating to the terminal device to stop a data transmission; wherein the transmission stopping indication information and the configuration information are located in two pieces of information respectively;
wherein the configuration information at least further comprises a configuration mode;
wherein the configuration mode at least comprises a subscriber-specific configuration mode, a subscriber group-specific configuration mode, or a combination of the subscriber-specific configuration mode and the subscriber group-specific configuration mode;
wherein the processor is configured to receive, via the network interface, the transmission stopping indication information based on group-common downlink control information when the configuration mode in the configuration information is the subscriber group-specific configuration mode.

11. The terminal device of claim 10, wherein the configuration information at least comprises a first data processing mode or a second data processing mode;
the first data processing mode is used for indicating stopping of the data transmission; and
the second data processing mode is used for indicating a data retransmission.

12. The terminal device of claim 11, wherein the first data processing mode uses the subscriber group-specific configuration mode, and the second data processing mode uses the subscriber-specific configuration mode.

13. The terminal device of claim 10, wherein part of bit information in the group-common downlink control information is used for indicating to the terminal device to stop the data transmission according to a first policy;
the first policy comprises: stopping the data transmission when a scrambling code used for scrambling the data is a first scrambling code; wherein the first scrambling code is a Cell Radio Network Temporary Identifier (C-RNTI).

14. A network device, comprising: a processor and a network interface, wherein
the processor is configured to send, via the network interface, configuration information of a transmission stopping indication, wherein the configuration information is used for a terminal device to receive transmission stopping indication information, and the transmission stopping indication information is used for indicating to the terminal device to stop a data transmission; wherein the transmission stopping indication information and the configuration information are located in two pieces of information respectively;
wherein the configuration information at least further comprises a configuration mode;
wherein the configuration mode at least comprises a subscriber-specific configuration mode, a subscriber group-specific configuration mode, or a combination of the subscriber-specific configuration mode and the subscriber group-specific configuration mode;
wherein when the configuration mode in the configuration information is the subscriber group-specific configuration mode, the configuration information indicates to the terminal device to receive the transmission stopping indication information based on group-common downlink control information.

15. The network device of claim 14, wherein the configuration information at least comprises a first data processing mode or a second data processing mode;
the first data processing mode is used for indicating stopping of the data transmission, and the second data processing mode is used for indicating a data retransmission.

16. The network device of claim 15, wherein the first data processing mode uses the subscriber group-specific configuration mode, and the second data processing mode uses the subscriber-specific configuration mode.

17. The network device of claim 14, wherein part of bit information in the group-common downlink control information is used for indicating to the terminal device to stop the data transmission according to a first policy;
the first policy comprises: stopping the data transmission when a scrambling code used for scrambling the data is a first scrambling code; wherein the first scrambling code is a Cell Radio Network Temporary Identifier (C-RNTI).

* * * * *